Sept. 12, 1944.　　　G. E. MILLER　　　2,358,020

COLOR ANALYZING DEVICE

Filed Aug. 31, 1940　　　2 Sheets-Sheet 1

INVENTOR.
George E. Miller
BY Spencer Hardman and Fehr
ATTORNEYS

Sept. 12, 1944. G. E. MILLER 2,358,020
COLOR ANALYZING DEVICE
Filed Aug. 31, 1940 2 Sheets-Sheet 2
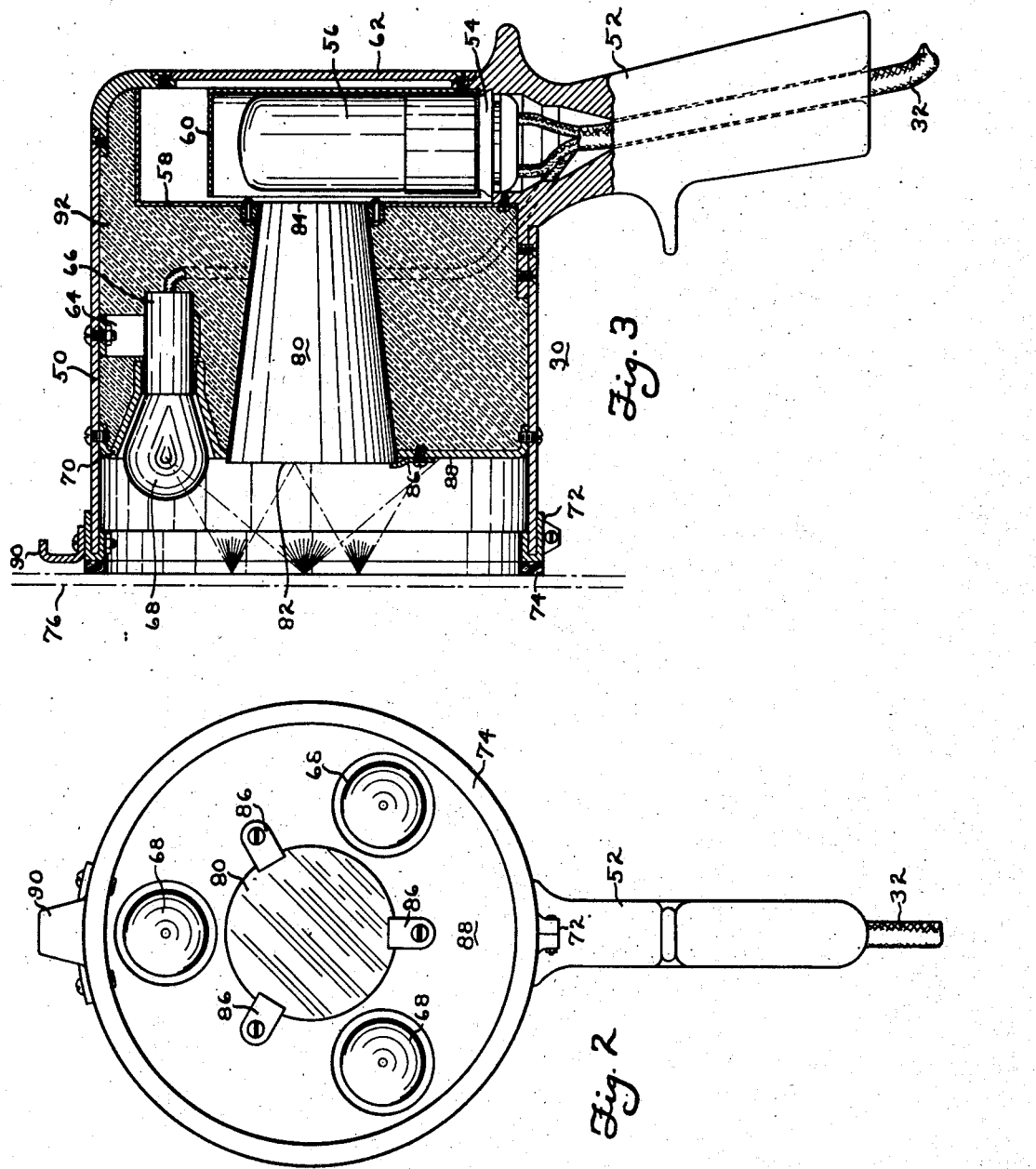

Patented Sept. 12, 1944

2,358,020

UNITED STATES PATENT OFFICE 2,358,020

COLOR ANALYZING DEVICE

George E. Miller, Springcreek Township, Miami County, Ohio, assignor to General Motors Corporation, Dayton, Ohio, a corporation of Delaware Application August 31, 1940, Serial No. 355,015

4 Claims. (Cl. 88—14)

This invention relates to means for analyzing the color of the finish on refrigerator cabinets and other surfaces.

When refrigerator cabinets are coated with porcelain or other materials, the finished parts are not always exactly the same shade. This is also true with respect to many other products. Heretofore, surfaces have mainly been matched and graded by eye. In some cases special metering systems have been used but special handling was required under this arrangement.

It is an object of my invention to provide a color analyzing device suitable for grading refrigerator cabinets and parts thereof while on the assembly line.

It is another object of my invention to provide a portable color analyzing device which can be held in one hand and applied to a moving or stationary surface in substantially any desired position.

It is another object of my invention to provide a color analyzing device employing only indirect or diffused light for grading purposes.

It is another object of my invention to provide a color analyzing device which will be responsive to an illuminated area as distinguished from direct reflected light.

Further objects and advantages of the present invention will be apparent from the following description, reference being had to the accompanying drawings wherein a preferred form of the present invention is clearly shown.

In the drawings:

Fig. 2 is a front view of the scanning unit; and

Fig. 3 is a vertical sectional view of the scanning unit.

Figure 1:
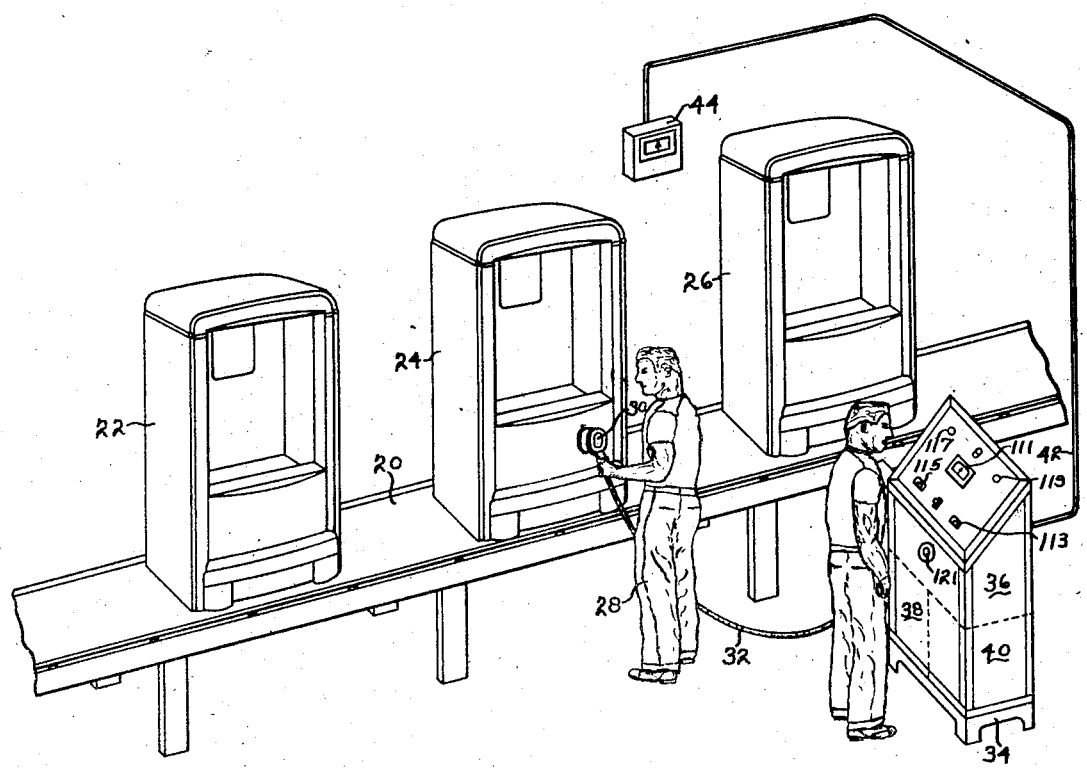
Fig. 1 is a perspective view of one form of my invention illustrating its application to refrigerator cabinets moving upon the conveyor of an ordinary assembly line.

Briefly, I have shown a color analyzing device including a portable scanning unit adapted to be held in one hand and applied directly to various surfaces of objects moving upon a conveyor or disposed in any manner. The scanning unit includes a light source, a light sensitive element and a shield for excluding external light and for confining the light produced by the light source. The light sensitive element controls the flow of minute electric current which is amplified in a separate much less portable unit which in turn supplies the amplified current to a micro-ammeter which measures the current to indications provided by the micro-ammeter indicating various shades of color.

Referring now to the drawings and more particularly to Fig. 1 there is shown a conveyor 20 of an assembly line having refrigerator cabinets 22, 24 and 26 being conveyed thereon. An inspector 28 is shown applying the novel portable scanning unit 30 to a portion of the refrigerator cabinet 24 as it passes by on the conveyor. This scanning unit 30 may be either held in one spot upon the cabinet or it may be moved across the various surfaces in order to obtain a better average color indication. The scanning unit 30 includes a source of light and a light sensitive element. A shield is provided for confining the light to the portion of the cabinet surface adjacent the light sensitive element. The shield also serves to exclude extraneous light.

The scanning unit 30 is connected by adequately shielded flexible electrical conductor means 32 to a cabinet 34 which normally rests upon the floor in one position at all times. This cabinet 34 includes an amplifying portion 36 for amplifying the current controlled by the light sensitive element of the scanning unit. The cabinet also includes a battery portion 38 and a voltage regulating portion 40 for supplying electric energy at an extremely uniform voltage to the light source and the light sensitive element. Either a direct or alternating current supply source may be used. The current amplified in the amplifying portion 36 is conducted by the conductor 42 to the micro-ammeter 44. This micro-ammeter 44 may be incorporated in the cabinet 34 or it may be placed at any suitable location where it can be readily seen by the inspector when applying the scanning unit to any of the cabinets. Ordinarily the inspector 28 will stamp upon the cabinet the reading of the micro-ammeter 44.

The cabinet 34 is provided with a combined micro-ammeter and voltmeter 111 with several suitable scales. A selector switch 113 is provided to selectively supply the current, controlled by the light sensitive element and amplified by the amplifying portion 36 to either the indicating meter 44 or the combined meter 111 or both. A second selector switch 115 is provided for connecting the combined meter 111 to various parts of the amplifying portion 36 as well as the battery portion 38 and the voltage regulating portion 40. An indicating light 117 is provided for indicating when the voltage is on. An indicating light 119 is provided for indicating when the meter 44 is in operation. The cabinet 34 is also provided with a calibrating knob 121.

When using the apparatus, one or more sample panels of known color analysis are used as a standard. These may be fastened to one of the walls of the cabinet 34. The scanning unit 30 is applied to one of the samples and the calibrating knob is adjusted to bring the hand of the indicating meter to the correct color value of the sample. Other samples of other shades may be used to check the adjustment. In selecting a door for the cabinet this reading is noted and a door having a similar reading is selected and attached in its proper place in the cabinet. Thus, by this method of selection the door will match within very close limits the remainder of the cabinet.

As shown in Figs. 2 and 3, the scanner 30 includes a housing or cylindrical shield 50 having a handle unit 52 connected to one end of the shield 50. This handle unit contains a socket 54 which receives a current-passing type of photoelectric cell 56. For grading porcelain, the so-called blue sensitive photoelectric cell is preferred. That is, this cell is designed to have a color sensitivity which reaches a maximum in the blue region of the spectrum. This cell is sometimes called a rubidium phototube, since it has a heavy rubidium coating upon the cathode which is preferably semi-cylindrical. The photocell 56 is housed within a metal sub-casing 58 and shielded by the shield 60 from light entering the rear of the scanning unit 30. The rear of the scanning unit is provided with a removable access plate 62 which is preferably perforated so as to provide some ventilation around the photocell 56 to prevent it from overheating.

Fastened by the brackets 64 to the casing 50 are three automobile type lamp bulb sockets 66 which are distributed 120° apart. Each of these bulb sockets 66 is provided with a single filament automobile headlight bulb 68 of a normal rating of either 6 or 12 volts. Each of the light bulbs is provided with a reflector 70 for directing light rays emitted by the filament onto the surface to be analyzed. The front edge of the cylindrical shield or housing 50 is provided with a removable rim 72 which is provided with some form of extremely flexible rubber seal for the purpose of making sealing contact with the surface to be analyzed regardless of its configuration. As shown, the rim 72 is provided with a ring 74 of sponge rubber or some other suitable material in order to provide a sealing light excluding contact with the surface to be analyzed. The surface to be analyzed is indicated in dot and dash lines by the reference character 76.

As an important feature of my invention I provide an improved and novel means for securing better grading results by only transmitting the light emitted substantially normal to the surface to be analyzed. By this improved means, I also prevent the transmission of the direct reflections of the light emitted by the light source; that is, the light bulbs 68. For this purpose I provide a solid member 80. Preferably this member 80 is of a material known best by several of its trade names, such as "Lucite," "Crystalite" and "Plexiglas." This material is a polymethyl methacrylate and has the poly formula—

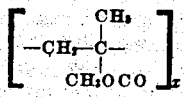

This material is preferred since it takes a very high polish and therefore can provide high reflecting power so that only light rays entering substantially normal to the polished surface will be admitted, while the remainder will be reflected. This material also has extremely high light transmitting properties and thus practically all of the light admitted will be transmitted to the light sensitive element. This material is also preferable because it is light in weight and by comparison lower in cost. Quartz and some grades of glass may be used in place of the preferred material, but the results are not as good, costs are higher, polishing is more difficult and the weight is greater.

This member 80 is in the shape of a truncated cone and has a polished large end surface 82. This polished surface is perfectly plane. The round portions of the member 80 are roughened and may be coated with paint so as to prevent reflection within the member 80. The opposite end 84 of the element 80 is exactly parallel to the surface 82 and is extremely highly polished to cause the light to be emitted therefrom upon the light sensitive element or photocell 56. By this arrangement, the photoelectric cell is substantially directly responsive to an illuminated area rather than direct reflected light from the light bulb 68. This is because the surface 82 is perfectly plane and highly polished and will admit only light projected substantially normal to its surface.

The member 80 is supported by three removable clips 86 which are fastened to the vertical wall 88 which supports the reflectors 70. The distance maintained between the polished face 82 of the member 80 and the surface of the work being analyzed is highly important, since if the work is too far away from the surface light will be reflected substantially normal to the surface and will be admitted by the member 80. If the surface to be analyzed is placed too close to the polished surface 82 then the surface to be analyzed will not have uniform illumination. I have found that the proportions shown in Figs. 2 and 3 provide substantially uniform illumination and yet prevent direct reflected light from being admitted by the member 80 and transmitted to the photocell 56.

The unit 30 is provided with a hook 90. The handle 52 is made hollow for receiving the shielded flexible conductor 32 which contains conductors connecting to the socket 54 as well as to each of the sockets 66. The voltage regulator 40 provides an accurately regulated supply of electrical energy to each of the bulbs so that a very uniform source of light is always provided. This scanning unit 30 is filled with a light weight insulating material 92 and is relatively small and light in weight and can readily be applied to the cabinets as they pass by upon the conveyor 20. All the metal parts are painted with a flat tone or dull black paint to prevent reflection. Only the necessary elements are placed in the scanning unit 30 so that it will be kept as light and portable as possible and the remaining units are located in the relatively stationary cabinet 34 with the exception of the micro-ammeter 44 which may be located where it is most convenient to read.

The micro-ammeter is preferably of the suppressed type. That is, the meter is of such a type that the first portion of the scale is suppressed in order to spread usable portions of the scale to obtain a wider deflection of the meter and for the same change in current passing through the meter.

While the form of embodiment of the invention as herein disclosed, constitutes a preferred form, it is to be understood that other forms might be adopted, all coming within the scope of the claims which follow.

What is claimed is as follows:

1. A color analyzing device for surfaces to be analyzed including a light sensitive element, a solid light transmitting member located adjacent said light sensitive element for transmitting light thereto, said member having a plane polished light entering surface for reducing the amount of light rays admitted at a substantial angle to its surface, spacing means for holding the entering surface in spaced generally parallel relationship with respect to the surface to be analyzed, and a light source located laterally of the polished light entering surface for illuminating the surface to be analyzed and materially reducing the amount of directly reflected light entering the member, and supporting means for said element, said member and said light source.

2. A color analyzing device for surfaces to be analyzed including a light sensitive element, a solid light transmitting member having a light exit surface located adjacent said light sensitive element for transmitting light thereto, said member having a plane polished light entering surface for reducing the amount of light rays admitted at a substantial angle to its surface, a plurality of sources of light equally distributed around the light entering surface so that direct reflections of the light from the surface to be analyzed will strike the polished light entering surface at a sufficient angle to materially reduce the proportion of direct reflected rays entering the light entering surface, and supporting means for said element, said member, and said light source.

3. A color analyzing device for surfaces to be analyzed including a light sensitive element, a solid light transmitting element having a light exit surface located adjacent the light sensitive element and a plane polished light entering surface, a light source surrounding the light transmitting element for illuminating the surface to be analyzed, said light source being located substantially in the plane of said plane polished surface, means for shielding the transmitting element and the sensitive element from the direct rays of the light source, and supporting means for said light sensitive element, said light transmitting element, said light source and said shielding means.

4. The method of color determination which includes illuminating the object the color of which is to be determined, placing a substantially plane polished light-entering surface of a light transmitting member near said object and disposed laterally of the source of illumination at an acute angle to the path of specularly reflected light whereby the greater portion of the specularly reflected rays of light reaching the polished surface is reflected from the polished surface and the greater portion of the light admitted by the transmitting member is diffused reflected light, and measuring the light transmitted by the light transmitting member.

GEORGE E. MILLER.